FINK & DAVELER.
Shaft Holder.
No. 95,452.
Patented Oct. 5, 1869.
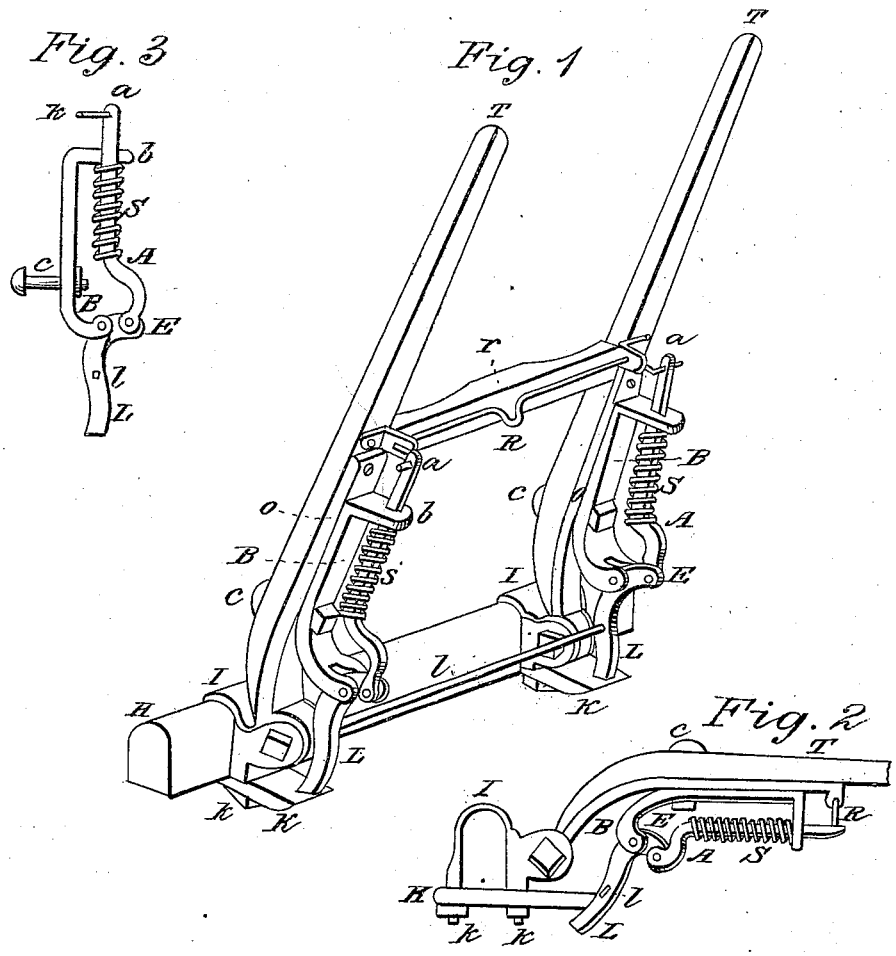
Witnesses:
Wm. B. Wiley
Jacob Staeffer
Inventors
Reubin Fink
Reuben Daveler

United States Patent Office.

RUBIN FINK AND REUBEN DAVELER, OF LANCASTER, PENNSYLVANIA.

Letters Patent No. 95,452, dated October 5, 1869.

IMPROVED DEVICE FOR SUPPORTING THE SHAFTS OF VEHICLES.

The Schedule referred to in these Letters Patent and making part of the same.

*To all whom it may concern:*

Be it known that we, RUBIN FINK and REUBEN DAVELER, of the city of Lancaster, in the State of Pennsylvania, have invented a new and improved Device for Supporting the Shafts of Vehicles; and we declare that the following is a full, clear, and exact description of the construction and operation thereof, reference being had to the accompanying drawings, making a part of this specification, in which—

Figure 1 is a perspective view of our improvement in place, showing the shafts propped up.

Figure 2, the position of the parts when the shafts are down.

Figure 3, profile view of the combined lever and spring detached from the clip and shafts or thill-coupling.

The nature of our invention consists in providing a means, in connection with the ordinary clips, to support the shafts of vehicles in a vertical position, so desirable, in order to economize space in the shed or in the road, where a great number of vehicles is brought together on occasions of gatherings in town or country.

To enable others skilled in the art to make and use our invention, it is only necessary to inspect the drawings.

Fig. 1 shows a supporting-device on each side of the shaft or clip, operated by a bent lever-rod, R, centrally between the shafts.

A crank-like handle on one side may be employed to work both levers L, by means of the connecting-bar $l$.

The prolonged piece of the thill, or clip I, marked $o$, supports the fulcrum-piece B by means of a headed bolt, $c$, entering through the shaft and plates O B, and secured by a nut.

This fulcrum-piece B is curved below, for a pin or pivot, and turned out at right angles above, at $b$, with a slot for the stem of the spring fulcrum A.

This is also curved and perforated for a pin.

A coiled spring, $s$, is shown, and a lever, L, with an elbow, E, connected by pins to both the fulcrum-pieces A B, at separate points, as shown.

The levers L are connected by a rod, $l$.

The ends of the levers L rest or lock, by the action of the spring upon the prolonged plate K, under the clip, and thus prop up the shaft.

A pull or turn on the spring fulcrum A, at its connection at $a$ with the lever-rod or handle R, throws the lever L out, and, the shafts released, lower them to the position shown by fig. 2.

The drawings of the device are nearly full-size, but the shafts greatly reduced, causing the same to look out of proportion.

We are aware that various clips or thill-couplings are adopted for holding up the shafts, but they soon wear, and lose their efficacy.

We are not aware that a device, attached expressly for the purpose, combined and operating substantially in manner specified, has ever been used.

What we claim as our invention, and desire to secure by Letters Patent, is—

The combination and arrangement of the elbowed lever L E, fulcra A B, spring S, and rod $l$, when attached to the shafts of vehicles, substantially in the manner and for the purpose specified.

RUBIN FINK.
REUBEN DAVELER.

Witnesses:
WM. B. WILEY,
JACOB STAUFFER.